United States Patent
Kim et al.

(10) Patent No.: US 10,658,662 B2
(45) Date of Patent: May 19, 2020

(54) ELECTRODE ACTIVE MATERIAL FOR MAGNESIUM BATTERY

(71) Applicant: SAMSUNG ELECTRONICS CO., LTD., Suwon-si, Gyeonggi-do (KR)

(72) Inventors: Jusik Kim, Seongnam-si (KR); Seoksoo Lee, Yongin-si (KR); Ryounghee Kim, Yongin-si (KR); Wonseok Chang, Seoul (KR)

(73) Assignee: SAMSUNG ELECTRONICS CO., LTD., Gyoenggi-Do (KR)

( * ) Notice: Subject to any disclaimer, the term of this patent is extended or adjusted under 35 U.S.C. 154(b) by 991 days.

(21) Appl. No.: 15/032,836

(22) PCT Filed: Apr. 29, 2014

(86) PCT No.: PCT/KR2014/003773
§ 371 (c)(1),
(2) Date: Apr. 28, 2016

(87) PCT Pub. No.: WO2015/064867
PCT Pub. Date: May 7, 2015

(65) Prior Publication Data
US 2016/0254541 A1    Sep. 1, 2016

(30) Foreign Application Priority Data

Oct. 29, 2013   (KR) .................. 10-2013-0129568

(51) Int. Cl.
*H01M 4/505*   (2010.01)
*H01M 4/485*   (2010.01)
(Continued)

(52) U.S. Cl.
CPC ............ *H01M 4/505* (2013.01); *C01G 45/02* (2013.01); *C01G 45/125* (2013.01);
(Continued)

(58) Field of Classification Search
None
See application file for complete search history.

(56) References Cited

U.S. PATENT DOCUMENTS 4,246,253 A * 1/1981 Hunter .................. C01G 45/02
423/599
6,316,141 B1  11/2001 Aurbach et al.
(Continued)

FOREIGN PATENT DOCUMENTS

CN    101320806 A    12/2008
JP    2001076721 A    3/2001
(Continued)

OTHER PUBLICATIONS

Ling et. al; "Phase Stability of Post-spinel Compound AMn2O4 (A=Li, Na, or Mg) and Its Application as a Rechargeable Battery Cathode"; Jun. 28, 2013 (Year: 2013).*
(Continued)

*Primary Examiner* — Barbara L Gilliam
*Assistant Examiner* — Nathanael T Zemui
(74) *Attorney, Agent, or Firm* — Cantor Colburn LLP

(57) ABSTRACT

Provided are an electrode active material for a magnesium battery, including a complex transition metal oxide which is represented by a Formula 1 below and which includes $\lambda$-$MnO_2$ phase having a cubic structure at a percentage of 60% or higher, an electrode and a magnesium battery including the same, and a method of preparing the electrode active material for a magnesium battery: <Formula 1> $M_xMn_yO_z$ In the Formula 1, $0<x\leq1$, $0.25\leq y\leq1$, and $1\leq z<3$; and M is at least one metal selected from $Mg^{2+}$, $Ca^{2+}$, $Na^+$, $K^+$, and $Zn^{2+}$.

20 Claims, 4 Drawing Sheets

REFERENCE EXAMPLE 1

EXAMPLE 1

(51) Int. Cl.
*H01M 4/38* (2006.01)
*H01M 4/131* (2010.01)
*H01M 4/66* (2006.01)
*H01M 4/62* (2006.01)
*H01M 10/054* (2010.01)
*H01M 10/0568* (2010.01)
*H01M 10/0569* (2010.01)
*C01G 45/12* (2006.01)
*C01G 45/02* (2006.01)
*H01M 4/04* (2006.01)
*H01M 4/1391* (2010.01)
*H01M 4/02* (2006.01)

(52) U.S. Cl.
CPC ........ *C01G 45/1228* (2013.01); *H01M 4/131* (2013.01); *H01M 4/38* (2013.01); *H01M 4/381* (2013.01); *H01M 4/485* (2013.01); *H01M 4/623* (2013.01); *H01M 4/625* (2013.01); *H01M 4/661* (2013.01); *H01M 10/054* (2013.01); *H01M 10/0568* (2013.01); *H01M 10/0569* (2013.01); *C01P 2002/72* (2013.01); *C01P 2002/74* (2013.01); *C01P 2002/76* (2013.01); *C01P 2002/85* (2013.01); *C01P 2004/03* (2013.01); *C01P 2004/10* (2013.01); *C01P 2004/32* (2013.01); *C01P 2004/62* (2013.01); *C01P 2004/64* (2013.01); *C01P 2006/40* (2013.01); *H01M 4/0404* (2013.01); *H01M 4/1391* (2013.01); *H01M 2004/027* (2013.01); *H01M 2004/028* (2013.01); *H01M 2220/10* (2013.01)

(56) References Cited

U.S. PATENT DOCUMENTS

| | | | |
|---|---|---|---|
| 6,576,216 B2 | 6/2003 | Han et al. | |
| 8,361,661 B2 | 1/2013 | Doe et al. | |
| 9,214,257 B2 | 12/2015 | Ryu et al. | |
| 2002/0090553 A1* | 7/2002 | Han | C01G 45/1242 |
| | | | 429/224 |
| 2006/0019165 A1 | 1/2006 | Yamaguchi et al. | |
| 2011/0189543 A1 | 8/2011 | Choi et al. | |
| 2011/0262804 A1 | 10/2011 | Muldoon et al. | |
| 2012/0219856 A1 | 8/2012 | Doe et al. | |
| 2012/0219859 A1* | 8/2012 | Doe | C01B 25/372 |
| | | | 429/219 |
| 2013/0004830 A1* | 1/2013 | Song | H01M 10/054 |
| | | | 429/163 |
| 2014/0178773 A1 | 6/2014 | Ryu et al. | |
| 2015/0056515 A1 | 2/2015 | Kim et al. | |
| 2015/0086859 A1 | 3/2015 | Chang et al. | |

FOREIGN PATENT DOCUMENTS

| | | | |
|---|---|---|---|
| JP | 2002025555 | A | 1/2002 |
| JP | 2004119167 | A | 4/2004 |
| JP | 2012221670 | A | 11/2012 |
| JP | 20130533577 | A | 8/2013 |
| KR | 1020020039944 | A | 5/2002 |
| KR | 1067115 | B1 | 9/2011 |
| KR | 1020120073757 | A | 7/2012 |
| KR | 1020140008104 | A | 1/2014 |
| KR | 1020140081507 | A | 7/2014 |
| WO | 2011150093 | A1 | 12/2011 |

OTHER PUBLICATIONS

Han et. al; "Synthesis of Li Mn2O4 by modified Pechini method and characterization as a cathode for rechargeable Li/LiMn"; (Year: 2000).*
Hirofumi Kanoh et al., AC Impedance Analysis for Li+ Insertion of a Pt/λ-MnO2 Electode in an Aqueous Phase, Aug. 1996, pp. 2610-2615, vol. 143, No. 8, J. Electrochem. The Electrochemical Society, Inc.
Hirofumi Kanoh et al., Electrochromic Behavior of a Lambda-MnO2 Electrode Accompanying Li+-Insertion in an Aqueous Phase, Mar. 1996, pp. 905-907, vol. 143, No. 3, J. Electrochem. The Electrochemical Society, Inc.
International Search Report for PCT/KR2014/003773 dated Apr. 29, 2014.
Shahid Rasul et al., Manganese oxide octahedral molecular sieves as insertion electrodes for rechargeable Mg batteries, 2013, pp. 247-252, Electrochimica Acta, Elsevier.
Shahid Rasul et al., Synthesis and electrochemical behavior of hollandite MnO2/acetylene black composite cathode for secondary Mg-ion batteries, 2012, pp. 542-546, Solid State Ionics, Elsevier.
Written Opinion of the International Searching Authority for PCT/KR2014/003773 dated Aug. 8, 2014.
Korean Office Action for Application No. 10-2013-0129568 dated Feb. 20, 2020.

* cited by examiner

[Fig. 1]
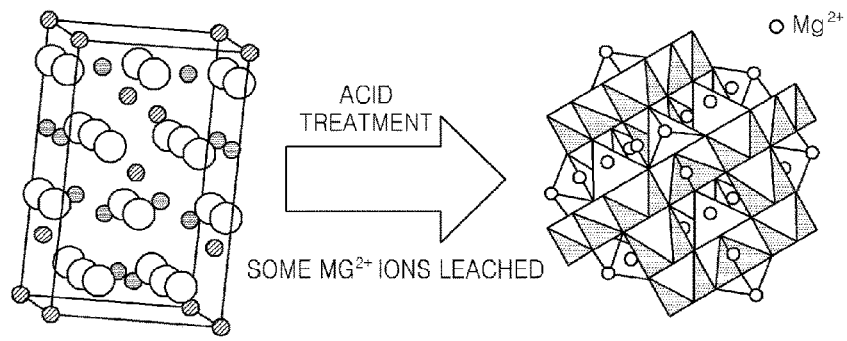
REFERENCE EXAMPLE 1      EXAMPLE 1
[Fig. 2a]
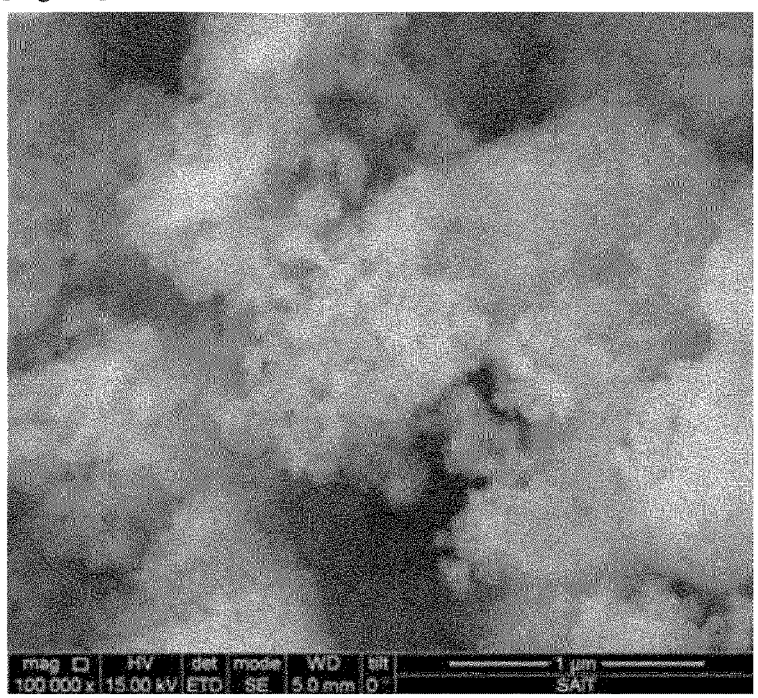
[Fig. 2b]
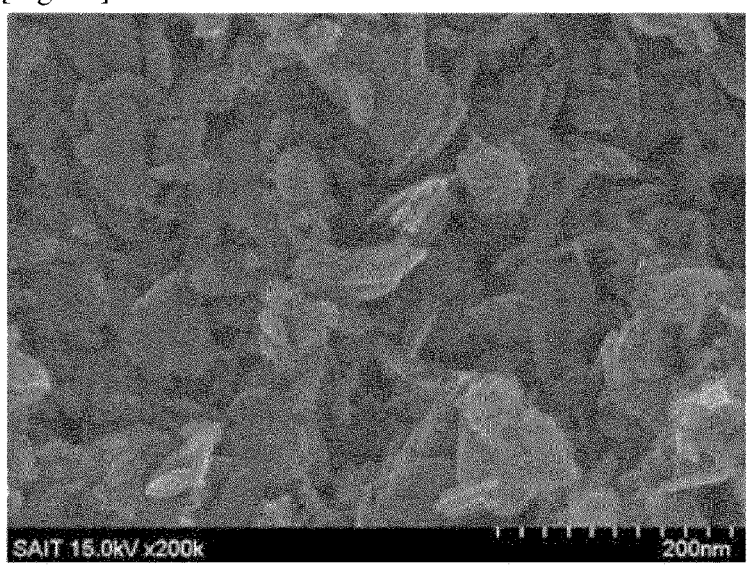

[Fig. 2c]
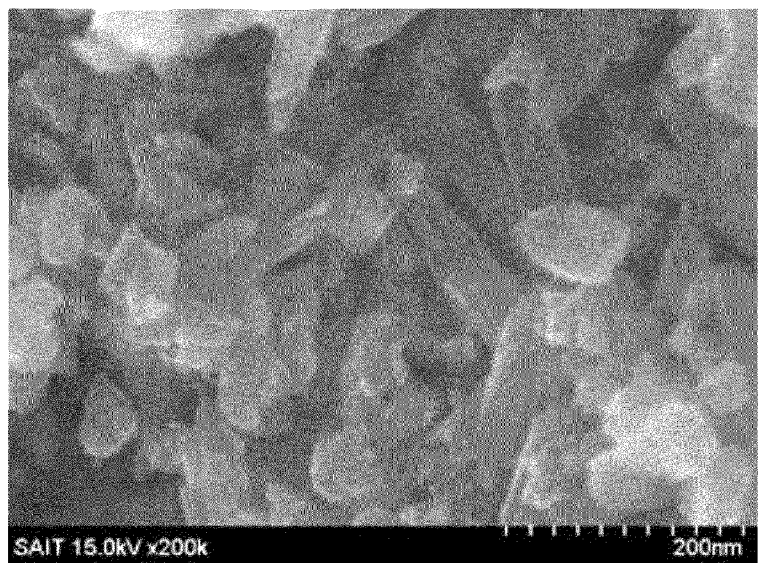
[Fig. 3]
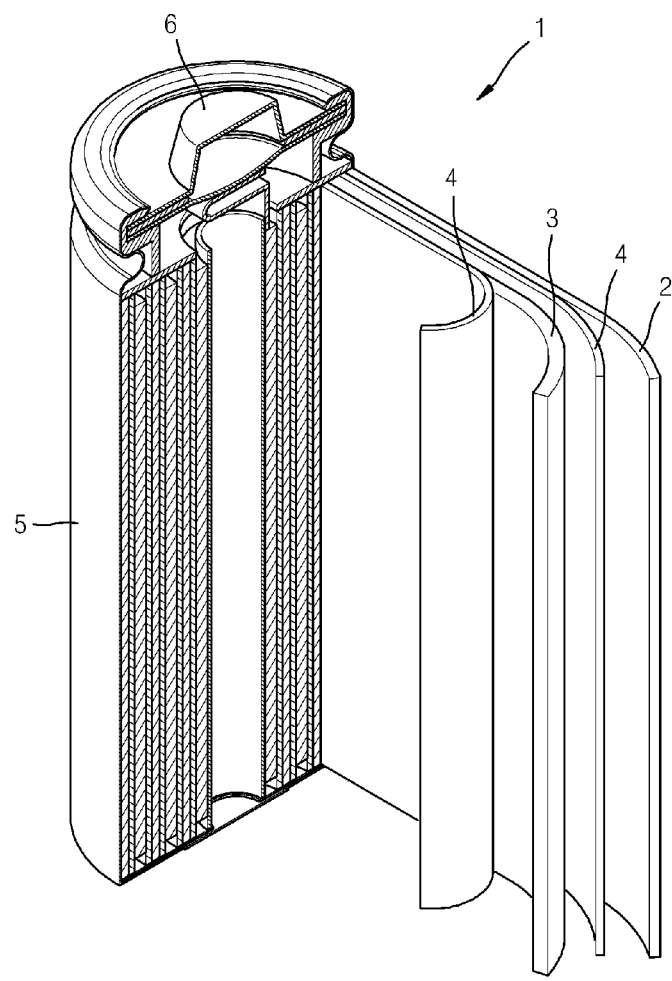

[Fig. 4]
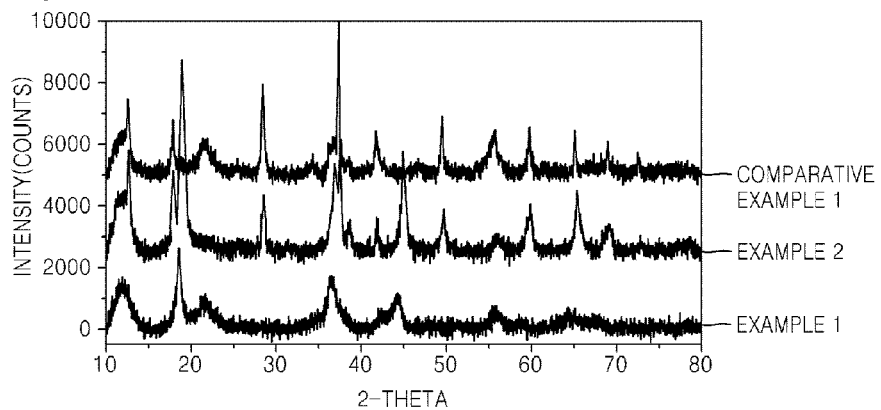
[Fig. 5]
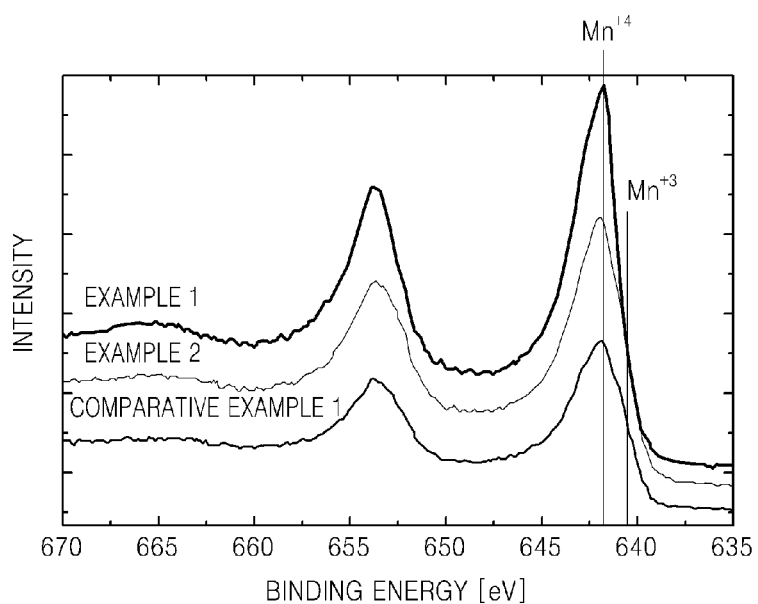
[Fig. 6a]
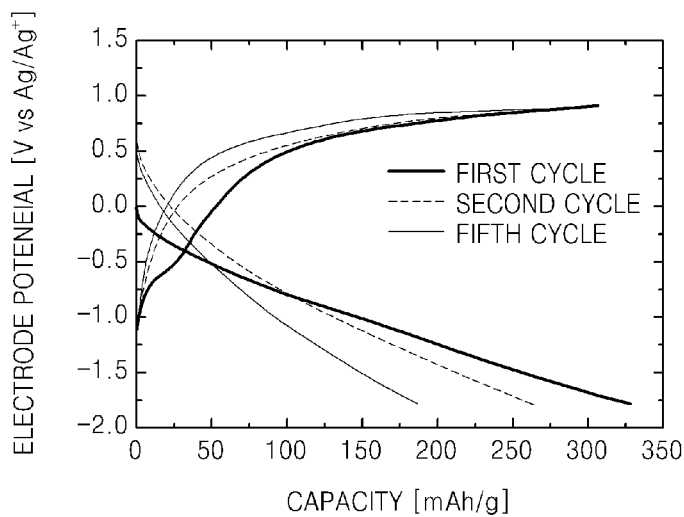

[Fig. 6b]
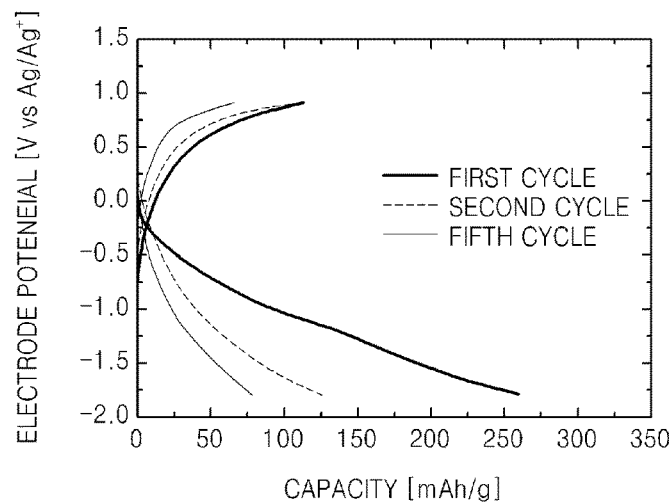
[Fig. 7a]
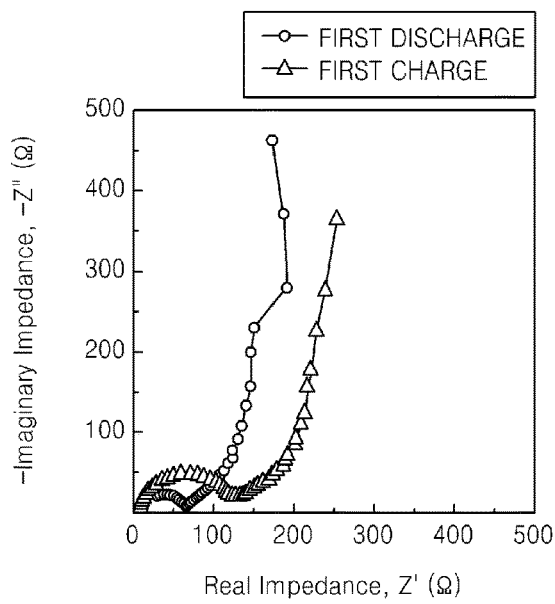
[Fig. 7b]
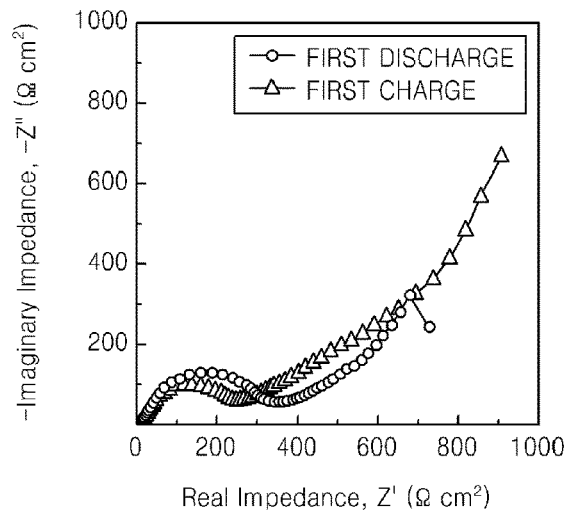

ELECTRODE ACTIVE MATERIAL FOR MAGNESIUM BATTERY

TECHNICAL FIELD

The present disclosure relates to an electrode active material for a magnesium battery, an electrode and a magnesium battery including the same, and a method of preparing the electrode active material for a magnesium battery.

BACKGROUND ART

Renewable energy, which is drawing attention as future alternative energy, requires an energy storage system (ESS) which allows for efficient electric energy storage in and supply to a power grid in order to improve electric power quality and efficiency.

As an energy storage device for such an ESS, a lithium battery, for example, a lithium ion secondary battery, is drawing attention. However, a lithium ion secondary battery is limited as an energy storage device for a high capacity electric power storage system due to uneven distribution of lithium resources, a high price, and stability problems such as the danger of explosion by exposure to air.

The unit price per unit energy density of a lead-acid battery, which is used as an alternative, is about 25% of that of a lithium ion secondary battery. However, as the lifecycle is deteriorated by deep charge/discharge and the lifecycle is as short as five years, an extra cost is required to compensate or maintain a lead-acid battery. As the use of lead is limited and recycling of lead becomes mandatory by Restriction of the use of Hazardous Substances (RoHS) in electrical and electronic equipment (EEE), the unit price of electric power generation by a system in which a lead-acid battery is applied will increase even more.

However, in contrast to lithium, magnesium, which is used for a magnesium battery, may be obtained from salt water and minerals in a great quantity and thus magnesium is low in price, environmentally friendly, and easy to handle. In addition, the capacity per unit volume of magnesium is 3,833 mAh/cm$_3$, which is much higher than that of lithium, 2,061 mAh/cm$_3$, and magnesium is much more stable than lithium. Therefore, there is a great potential to develop a magnesium battery as an energy storage device for a high-capacity electric power storage system.

However, different from a lithium ion, a magnesium ion has two electric charges, showing high electric charge properties, and thus the diffusion rate of a magnesium ion becomes low as the magnesium ion is inserted into an electrode active material, for example, a positive electrode active material, due to a strong Coulomb interaction with elements constituting the positive electrode active material. As a result, the substantial capacity of a magnesium battery is reduced and the reversibility, initial efficiency, and discharge voltage of the magnesium battery are also decreased.

Therefore, there is a need for a positive electrode active material for a magnesium battery as an energy storage device for a high-capacity electric power storage system enabling reversible charge/discharge under a high voltage, an electrode and a magnesium battery including the same, and a method of preparing the electrode active material for a magnesium battery.

DISCLOSURE OF INVENTION

An aspect of the present invention provides an electrode active material for a magnesium battery having a high average discharge voltage, high charge/discharge efficiency, and a high charge/discharge capacity.

Another aspect of the present invention provides an electrode including the electrode active material.

Another aspect of the present invention provides a magnesium battery including the electrode active material as a positive electrode active material.

Another aspect of the present invention provides a method of preparing the electrode active material for a magnesium battery having a high average discharge voltage, high charge/discharge efficiency, and high charge/discharge capacity.

According to an aspect of the present invention, provided is an electrode active material for a magnesium battery, including a complex transition metal oxide which is represented by a Formula 1 below and which includes λ-MnO$_2$ phase having a cubic structure at a percentage of 60% or higher:

$$M_xMn_yO_z \qquad \text{<Formula 1>}$$

In the Formula 1,
0<x≤1, 0.25≤y≤1, and 1≤z<3; and
M is at least one metal selected from Mg$^{2+}$, Ca$^{2+}$, Na$^+$, K$^+$, and Zn$^{2+}$.

According to another aspect of the present invention, provided is an electrode for a magnesium battery including the electrode active material.

According to another aspect of the present invention, provided is a magnesium battery including
the positive electrode;
a negative electrode; and
an electrolyte.

According to another aspect of the present invention, provided is a method of preparing an electrode active material for a magnesium battery, including
obtaining a complex transition metal oxide of a spinel structure by a solid phase method or a liquid phase method; and
preparing a complex transition metal oxide which is represented by a Formula 1 below and which includes λ-MnO$_2$ phase having a cubic structure at a percentage of 60% or higher by treating with an acid the complex transition metal oxide of a spinel structure:

$$M_xMn_yO_z \qquad \text{<Formula 1>}$$

In the Formula 1,
0<x≤1, 0.25≤y≤1, and 1≤z<3; and
M is at least one metal selected from Mg$^{2+}$, Ca$^{2+}$, Na$^+$, K$^+$, and Zn$^{2+}$.

BRIEF DESCRIPTION OF DRAWINGS

These and/or other aspects will become apparent and more readily appreciated from the following description of the embodiments, taken in conjunction with the accompanying drawings in which:

FIG. 1 is a diagram showing that a MgMn$_2$O$_4$ positive electrode active material having a spinel structure of Reference Example 1 is treated with an acid and the Mg$^{2+}$ ion is partly leached to form the positive electrode active material of Example 1, including λ-MnO$_2$ phase having a cubic structure at a percentage of 60% or higher;

FIG. 2a is a scanning electron microscope (SEM) image of the MgMn$_2$O$_4$ positive electrode active material having a spinel structure in Reference Example 1;

FIG. 2b is an SEM image of the positive electrode active material prepared in Example 1;

FIG. 2c is an SEM image of the positive electrode active material prepared in Example 2;

FIG. 3 is a schematic diagram of a magnesium battery 1 according to an embodiment of the present invention;

FIG. 4 is an X-ray diffraction (XRD) spectrum of positive electrode active materials prepared in Examples 1 and 2 and in Comparative Example 1;

FIG. 5 is a graph showing X-ray photoelectron spectroscopy (XPS) analysis results of the positive electrode active materials prepared in Examples 1 and 2 and in Comparative Example 1;

FIG. 6a is a graph showing the charge/discharge property of a magnesium battery prepared in Example 4;

FIG. 6b is a graph showing the charge/discharge property of a magnesium battery prepared in Comparative Example 2;

FIG. 7a is a graph showing the Nyquist plot result of the magnesium battery prepared in Example 4; and FIG. 7b a graph showing the Nyquist plot result of the magnesium battery prepared in Comparative Example 2.

MODE FOR THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, an electrode active material for a magnesium battery, an electrode and a magnesium battery comprising the same, and a method of preparing the electrode active material for a magnesium battery, according to embodiments of the present invention, are described in more detail. However, as it is presented as an example, the present invention is not limited thereto and the present invention is defined only by the scope of the claims which will be described later.

An electrode active material for a magnesium battery, according to an embodment of the present invention, includes a complex transition metal oxide which is represented by a Formula 1 below and which includes λ-MnO$_2$ phase having a cubic structure at a percentage of 60% or higher:

$$M_xMn_yO_z \qquad \text{<Formula 1>}$$

In the Formula 1,

0<x≤1, 0.25≤y≤1, and 1≤z<3; and

M may be at least one metal selected from Mg$^{2+}$, Ca$^{2+}$, Na$^+$, K$^+$, and Zn$^{2+}$.

For example, in the Formula 1, the range of x, y, and z may be 0<x≤0.5, 0.25≤y<1, and 1≤z<2.5.

A magnesium battery generally includes a positive electrode, a negative electrode, and an electrolyte. As an electrolyte, an ether electrolyte of a Grignard magnesium salt (RMgX, where R is an alkyl group or an aryl group and X is Cl or Br) which does not form a film on a negative electrode is frequently used. An electrochemical reaction of a magnesium battery is, for example, as shown in a Reaction Formula 1 below.

Positive electrode: Mg ↔ Mg$^{2+}$ + 2e$^-$

Negative electrode: Mg$_y$RX + zMg$^{2+}$ ↔ Mg$_{y+z}$RX + 2e$^-$   <Reaction Formula 1>

As shown above, during discharge, an electron is discharged from the negative electrode to an external circuit and a generated magnesium positive ion passes through the electrolyte and is absorbed in the positive electrode (oxidation reaction). During charge, a magnesium positive ion is desorbed from the positive electrode and transferred to the negative electrode and an electron is regained as the negative electrode is plated with the magnesium (reduction reaction).

In the electrochemical reaction, for example, for the magnesium ion to pass through the electrolyte and be absorbed in the positive electrode, it is necessary for the magnesium positive ion to be effectively adsorbed onto and desorbed from the surface of the positive electrode active material. Among the adsorption and desorption reactions, a galvanic reaction on the surface of the positive electrode active material is considered as the most dominant reaction.

An electrode active material for a magnesium battery, according to an embodiment of the present invention, includes a complex transition metal oxide which is represented by the Formula 1 and which includes λ-MnO$_2$ phase having with a cubic structure at a percentage of 60% or higher and thus is able to increase binding energy of a reversible galvanic reaction of a magnesium positive ion to about 3.5 eV. Therefore, in comparison with a complex transition metal oxide including α-MnO$_2$ phase at a percentage of 60% or higher, the average discharge voltage, the charge/discharge efficiency, and the charge/discharge capacity of the electrode active material for a magnesium battery may be improved. The magnitude of the binding energy is specifically related to a crystal structure of an electrode active material for a magnesium battery.

For example, the complex transition metal oxide may be represented by a Formula 2 below and may include λ-MnO$_2$ phase having a cubic structure at a percentage of 60% or higher:

$$(Mg)_vMnO_w \qquad \text{<Formula 2>}$$

In the Formula 2,

0<v≤0.2 and 1<w<2.5.

In the Formula 2, the molar ratio of v and w refers to a molar ratio to one mol of a manganese (Mn) positive ion.

FIG. 1 is a diagram showing that a MgMn$_2$O$_4$ positive electrode active material having a spinel structure of Reference Example 1 is treated with an acid and the Mg$^{2+}$ ion is partly leached to form the positive electrode active material of Example 1 including λ-MnO$_2$ phase having a cubic structure at a percentage of 60% or higher.

As shown in FIG. 1, a magnesium positive ion already exists in the cubic structure of the λ-MnO$_2$ phase having a cubic structure so that the complex transition metal oxide may be structurally stable when the magnesium positive ion is absorbed. Therefore, the average discharge voltage, the charge/discharge efficiency, and the charge/discharge capacity of the electrode active material for a magnesium battery may be improved and lifecycle properties may be further improved.

The average oxidation number of the Mn positive ion of the complex transition metal oxide may be +3.6 or higher. For example, the average oxidation number of the Mn positive ion of the complex transition metal oxide may be +3.7 or higher.

In an X-ray photoelectron spectroscopy (XPS) analysis of the complex transition metal oxide, the percentage of Mn$^{4+}$ with respect to the oxidation number of the total Mn positive ions may be 60% or higher. For example, in an XPS analysis of the complex transition metal oxide, the percentage of $Mn^{4+}$ with respect to the oxidation number of the total Mn positive ions may be 70% or higher.

As there are more Mn positive ions having an oxidation number of +4 than those having an oxidation number of +3, a reduction reaction of the magnesium positive ions may occur easily during discharge. In other words, as the average oxidation number of the manganese positive ions in the complex transition metal oxide is relatively high, the binding energy of the magnesium positive ions to the surface of the positive electrode active material may become high and the resistance between the surface of the positive electrode active material and an electrolyte interface may be decreased to increase a charge transfer reaction rate.

Comparably, in a complex transition metal oxide including $\alpha$-$MnO_2$ phase having with a 2×2 tunnel structure at a percentage of 50% or higher, as the oxidation number of the manganese positive ions is changed during absorption of the magnesium positive ions, the octahedral structure of $MnO_6$ may be changed. As a result, the magnesium positive ions are very likely to be trapped between the tunnels and thus a reversible absorption-desorption reaction of the magnesium positive ions is difficult to occur. Therefore, the average discharge voltage, the charge/discharge efficiency, and the charge/discharge capacity of the electrode active material for a magnesium battery may be improved and lifecycle properties may be further improved.

The space group of the complex transition metal oxide may be Fd-3m (#227).

The content of Mg included in the complex transition metal oxide may be more than 0 wt % and less than 10 wt % with respect to the total weight of the complex transition metal oxide. For example, the content of Mg included in the complex transition metal oxide may be more than 0 wt % and less than 5 wt % with respect to the total weight of the complex transition metal oxide. A complex transition metal oxide including Mg in the content range described above may be structurally stable.

The average particle diameter of the complex transition metal oxide may be from about 1 nm to about 200 nm. For example, the average particle diameter of the complex transition metal oxide may be from about 1 nm to about 150 nm. For example, the average particle diameter of the complex transition metal oxide may be from about 1 nm to about 100 nm. The average particle diameter of the complex transition metal oxide may be verified with scanning electron microscope (SEM) images of FIGS. 2b and 2c described later. The complex transition metal oxide having an average particle diameter in the range described above has a high specific surface area and thus the average discharge voltage, the charge/discharge efficiency, and the charge/discharge capacity of a magnesium battery may be improved.

The shape of the complex transition metal oxide may be needle-like or spherical. In contrast to a spherical $MgMn_2O_4$ electrode active material having a spinel structure, the complex transition metal oxide may include mixed shapes including needle-like shape or spherical shape. For example, the needle-like shape may be a shape of a nano-rod or a nano-sheet.

The complex transition metal oxide may further include a phase having a Birnessite structure. The phase having the Birnessite structure may be, for example, $(Na_{0.3}Ca_{0.1}K_{0.1})(Mn^{4+}, Mn^{3+})_2O_4 \cdot 1.5H_2O$, but is not limited thereto. The phase having the Birnessite structure may include a phase having all Birnessite structures available in the art.

The electrode active material may be a positive electrode active material.

An electrode for a magnesium battery, according to an embodiment of the present invention, may include the electrode active material.

A magnesium battery according to an embodiment of the present invention includes a positive electrode including the positive electrode active material; a negative electrode; and an electrolyte. The magnesium battery may be a primary battery, and the magnesium secondary battery may be prepared, for example, by the following method:

Firstly, the positive electrode may be prepared, for example, by the following method:

For example, a positive electrode active material composition is prepared by mixing the positive electrode active material, a conductive material, a binder, and a solvent. The positive electrode active material composition is directly coated on a metal current collector to prepare a positive electrode plate. Alternatively, the positive electrode active material composition may be cast on a separate support and then a positive electrode active material composition film stripped from the support may be laminated on a metal current collector to prepare a positive electrode plate. The positive electrode is not limited to the types described above and may be another type.

In addition to the positive electrode active material including the complex transition metal oxide, the positive electrode may further include a conventional and general positive electrode active material.

For example, the conventional and general positive electrode active material may include at least one selected from an oxide, a sulfide, or a halide selected from the group consisting of scandium, ruthenium, titanium, vanadium, molybdenum, chrome, manganese, iron, cobalt, nickel, copper, lead, tungsten, zirconium, and zinc; and a magnesium composite metal oxide.

For example, the conventional and general positive electrode active material may be $Co_3O_4$, $Mn_2O_3$, $Mn_3O_4$, $MoO_3$, $PbO_2$, $Pb_3O_4$, $RuO_2$, $V_2O_5$, $WO_3$, $TiS_2$, $VS_2$, $ZrS_2$, $Mo_3O_4$, $Mo_6S_8$, $MoB_2$, $TiB_2$, $ZrB_2$, or others, but is not limited thereto. In addition, as an example of the magnesium composite metal oxide, a magnesium compound represented as $Mg(M_{1-x}A_x)O_4$ ($0 \leq x \leq 0.5$, M is Ni, Co, Mn, Cr, V, Fe, Cu, or Ti, and A is Al, B, Si, Cr, V, C, Na, K, or Mg) may be used.

As the conductive material, a carbon material with a high specific surface area, for example, carbon black, activated carbon, acetylene black, graphite particles, or a mixture thereof including two or more of the carbon materials may be used. In addition, an electroconductive fiber such as a gas-phase-grown carbon fiber, a fiber prepared by carbonizing pitch (a byproduct of petroleum, coal, coal tar, etc.) at a high temperature, and a carbon fiber prepared from polyacrylonitrile may be used as the conductive material. A carbon fiber and a carbon material with a high specific surface area may be used simultaneously. A carbon fiber and a carbon material with a high specific surface area may be used simultaneously to further improve electric conductivity. In addition, a metal conductive material, which is neither oxidized nor dissolved in a charge/discharge range of a positive electrode and which has a lower electric resistance than that of a positive electrode active material, may be used. For example, a metal conductive material may be a corrosion resistant metal such as titanium and gold, a carbide such as SiC and WC, or a nitride such as $Si_3N_4$, BN, but is not limited thereto. Any metal conductive material which may be used as a conductive material in the art may be used.

The binder may be poly(vinylidene fluoride-co-hexafluoropropylene), polyvinylidene fluoride (PVDF), polyacrylonitrile, polymethyl methacrylate, polytetrafluoroethylene, and a mixture thereof, or a styrene butadiene rubber polymer, but is not limited thereto. Any material which may be used as a binder in the art may be used.

The solvent may be N-methylpyrrolidone, acetone, or water, but is not limited thereto. Any solvent which may be used in the art may be used.

The metal current collector is not limited by material, shape, or preparation method.

Any electrochemically stable material may be used as the metal current collector. As the metal current collector, an aluminum film having a thickness from about 10 µm to about 100 µm, a perforated aluminum film having a thickness from about 10 µm to about 100 µm and having a hole diameter from about 0.1 mm to about 10 mm, an expanded metal, or a metal foam may be used. As a material of the metal current collector, stainless steel or titanium may be used in addition to aluminum.

The content of the positive electrode active material, conductive material, binder, and solvent is at a level which is general for a magnesium battery. Depending on the usage and composition of a magnesium battery, at least one of the conductive material, the binder, and the solvent may be omitted.

The operation potential of the positive electrode active material may be from about 1 V to about 4 V (vs. $Mg/Mg^{2+}$). For example, the working potential of the positive electrode active material may be from about 1 V to about 3.9 V (vs. $Mg/Mg^{2+}$). The positive electrode active material may have a high charge/discharge capacity under a high voltage in the range described above.

Next, a negative electrode is prepared.

In the magnesium battery, a negative electrode may include a magnesium metal, a magnesium metal-based alloy, a magnesium intercalating compound, or a carbon material, but is not limited thereto. Any material which may be used as a negative electrode active material in the art and which includes magnesium or which allows for absorption/desorption of magnesium may be used.

As the negative electrode determines a capacity of a magnesium battery, the negative electrode may be, for example, a magnesium metal. The magnesium metal-based alloy may be, for example, a magnesium alloy including aluminum, tin, indium, calcium, titanium, or vanadium.

For example, as the negative electrode, magnesium of a metal state having a thickness from about 3 µm to about 500 µm may be generally used and have various shapes such as a film, a sheet, a foil, a net, a porous body, foam, and non-woven fabric.

In a magnesium secondary battery, when a magnesium metal or a magnesium alloy is employed as a negative electrode active material, a negative electrode and a battery case may be integrated. In other words, at least a part of the battery case may be formed with a magnesium metal or a magnesium alloy which is a negative electrode active material so that a part of the battery case may function also as a negative electrode. Also, when a battery case is formed with a magnesium metal, as a magnesium metal is mostly inactive in air, the battery case has excellent handling convenience and safety. Therefore, a magnesium secondary battery, in which a battery case functions also as a negative electrode, has a lighter battery weight than that of a lithium secondary battery so that the magnesium secondary battery may have excellent properties such as excellent energy density and output density.

When a negative electrode active material besides a magnesium metal or a magnesium alloy is used, a carbonaceous material having a graphene structure may be used. A mixed negative electrode made of a mixture of graphite and graphitized carbon, a mixed negative electrode made of a mixture of a carbonaceous material and a metal or an alloy, or a composite negative electrode may be used. As a carbonaceous material, a carbonaceous material which enables electrochemical absorption and desorption of a magnesium ion, such as natural graphite, artificial graphite, mesophase carbon, expanded graphite, carbon fiber, gas-phase-grown carbon fiber, pitch-based carbonaceous material, needle cokes, petroleum cokes, polyacrylonitrile-based carbon fiber, and carbon black, or an amorphous carbon material synthesized by pyrolyzing a cyclic hydrocarbon such as a five-membered ring, a six-membered ring, or a cyclic oxygenated organic compound may be used.

When a negative electrode active material is a powder, a negative electrode may be prepared as follows: A negative electrode may be prepared in the same method of preparing a positive electrode, except that a negative electrode active material is used instead of the positive electrode active material. In addition, in a negative electrode active material composition, a conductive material, a binder, and a solvent, which are the same as those for a positive electrode, may be used.

For example, a negative electrode active material composition is prepared by mixing a negative electrode active material, a conductive material, a binder, and a solvent. Then, the negative electrode active material composition is directly coated on a copper current collector to prepare a negative electrode plate. Alternatively, the negative electrode active material composition may be cast on a separate support and then a negative electrode active material film stripped from the support may be laminated on a copper current collector to prepare a negative electrode plate.

As a negative electrode current collector, an arbitrary current collector may be used, regardless of the material, shape, and preparation method. For example, a copper film having a thickness from about 10 µm to about 100 µm, a perforated copper film having a thickness from about 10 µm to about 100 µm and having a hole diameter from about 0.1 mm to about 10 mm, an expanded metal, or a metal foam may be used. As a material of the negative electrode current collector, stainless steel, titanium, or nickel may be used in addition to copper.

The content of the negative electrode active material, the conductive material, the binder, and the solvent is at a level which is general for a magnesium battery.

Next, a separator is prepared.

The magnesium battery may further include a separator interposed between the positive electrode and the negative electrode.

The separator having a composition which may enable the separator to endure the use environment of a magnesium battery is not limited to any material. For example, a polymer non-woven fabric such as a polypropylene non-woven fabric and a polyphenylene sulfide non-woven fabric or a porous film made of an olefin-based resin such as polyethylene or polypropylene may be used and two or more of the materials may be used simultaneously.

In addition, as the separator, a material having a low resistance to ion transfer in an electrolyte and a high electrolyte-containing capacity may be used. For example, a material selected from glass fiber, polyester, Teflon, polytetrafluoroethylene (PTFE), and a combination thereof may be used and the shape may be a non-woven fabric or a woven fabric.

For example, the separator may be prepared by the following method:

A polymer resin, a filler, and a solvent are mixed to prepare a separator composition. The separator composition may be directly coated on the top of a negative electrode active material layer and dried to form the separator. Alternatively, the separator composition may be cast on a separate support and dried, and then, a separator film stripped from the support may be laminated on the top of a negative electrode active material layer to form the separator.

The polymer resin used to prepare the separator is not particularly limited, and any material used as a binder of an electrode plate may be used. For example, polyethylene, polypropylene, poly(vinylidene fluoride-co-hexafluoropropylene), PVDF, polyacrylonitrile, polymethyl methacrylate, or a mixture thereof may be used. As the filler used to prepare the separator, an inorganic particle may be used. As the solvent, any solvent which may dissolve the polymer resin and form a pore in the polymer resin when the solvent is dried and which is generally used in the art may be used.

In addition, the separator may be separately prepared by a known method and be laminated on the top of a negative electrode active material. For example, the separator may be prepared by a dry preparation method in which polypropylene or polyethylene may be melted and extruded to form a film, the film may be annealed at a low temperature, a crystal domain may be grown. Then, a stretching is performed to extend the amorphous domain to form a micro-porous film. For example, a low molecular weight material such as a hydrocarbon solvent may be mixed with polypropylene or polyethylene, and the mixture may be prepared as a film. Subsequently, as an amorphous solvent and a low molecular material start to form an island phase on the film, the amorphous solvent and low molecular material may be removed by using another volatile solvent. In this way, the separator may be prepared by a wet preparation method to form a micro-porous film.

In addition, to control the strength, hardness, or thermal contraction rate, the separator may further include an additive such as a nonconductive particle, another filler, or a fiber compound. For example, the separator may further include an inorganic particle. As the separator further includes the inorganic particle, the oxidation resistance of the separator may be improved and the deterioration of the battery properties may be repressed. The inorganic particle may be alumina ($Al_2O_3$), silica ($SiO_2$), titania ($TiO_2$), or others. The average diameter of the inorganic particle may be from about 10 nm to about 5 μm. When the average diameter of the inorganic particle is smaller than 10 nm, the crystallinity of the inorganic particle is low and thus the effect of adding the inorganic particle becomes negligible. When the average diameter of the inorganic particle is greater than 5 μm, the dispersion of the inorganic particle may be difficult.

To increase the tearing strength or mechanical strength, the separator may have a multilayer structure including at least one polymer layer. For example, the separator may include a polyethylene/polypropylene layer, a polyethylene/polypropylene/polyethylene layer, or a non-woven fabric/polyolefin layer.

Next, an electrolyte is prepared.

The electrolyte is liquid including magnesium of an ionized state and is prepared by dissolving in a solvent a magnesium salt which may be an electrolyte. The electrolyte may be included in a battery as either an organic electrolyte solution using an organic solvent or an aqueous electrolyte solution using water as a solvent.

As an electrolyte of a magnesium secondary battery, an aqueous electrolyte solution prepared by dissolving a magnesium salt in water may be used. As an organic solvent is not used, the aqueous electrolyte solution has the advantage that solvent does not combust.

On the other hand, as an organic electrolyte solution may enable a magnesium secondary battery to achieve a battery voltage that is higher than the water decomposition potential, an organic electrolyte solution allows for forming a magnesium secondary battery having a high output density.

In addition, a magnesium secondary battery, in which a magnesium metal is used as a negative electrode, may achieve a voltage from about 1.1 V to about 1.6 V, while a magnesium battery using an organic electrolyte solution may achieve a voltage from about 1.1 V to about 3.0 V.

A magnesium salt which may be used as an electrolyte in an aqueous electrolyte solution may be, for example, $Mg(OH)_2$, $MgCl_2$, $Mg(NO_3)_2$, or others, but is not limited thereto. Any magnesium salt which may be used as a water-soluble magnesium salt in the art may be used. In a negative electrode using a magnesium metal or a magnesium alloy as a negative electrode active material, to prevent deterioration (i.e. oxidation) of the negative electrode, $Mg(OH)_2$ may be used as the electrolyte. In an aqueous electrolyte solution, to increase the conductivity of the electrolyte solution, the electrolyte concentration may be a saturated concentration or a concentration near to the saturated concentration.

A magnesium salt which may be used as an electrolyte in an organic electrolyte solution may be, for example, $Mg(BF_4)_2$, $Mg(PF_6)_2$, $Mg(ClO_4)_2$, $Mg(CF_3SO_3)_2$, $Mg(AsF_6)_2$, or others.

In an organic electrolyte solution, as an organic solution, a nonprotonic organic solvent may be used. For example, the organic electrolyte solution for a magnesium secondary battery may include at least one organic solvent selected from the group consisting of dimethyl ether, diethyl ether, dimethyl carbonate, diethyl carbonate, ethyl methyl carbonate, dipropyl carbonate, methyl propyl carbonate, ethyl propyl carbonate, ethylene carbonate, propylene carbonate, butylene carbonate, methyl acetate, ethyl acetate, n-propyl acetate, dimethyl acetate, methyl propionate, ethyl propionate, γ-butyrolactone, decanolide, valerolactone, mevalonolactone, caprolactone, dibutyl ether, tetraglyme, diglyme, polyethylene glycol dimethyl ether, dimethoxyethane, 2-methyltetrahydrofuran, 2,2-dimethyltetrahydrofuran, 2,5-dimethyltetrahydrofuran, cyclohexanone, triethylamine, triphenylamine, triethylphosphine oxide, acetonitrile, dimethylformamide, 1,3-dioxolane, and sulfonate, but is not limited thereto. Any organic solvent which may be used as an organic solvent in the art may be used.

The electrolyte concentration in an organic electrolyte solution may be from about 0.001 M to about 10 M. When the concentration is low, the conductivity becomes low. When the concentration is high, the viscosity becomes too high that the low-temperature property of the battery may be deteriorated. The electrolyte solution may further include a flame-retarding material such as phosphate ester and phosphorous ester.

As shown in FIG. 3, a magnesium battery 1 includes a positive electrode 3, a negative electrode 2, and a separator 4. The positive electrode 3, the negative electrode 2, and the separator 4 are wound or bent to be included in a battery case 5. Then, an organic electrolyte solution is injected into the battery case 5 and the battery case 5 is sealed with a cap assembly 6 to complete the magnesium battery 1. The battery case 5 may have a cylindrical shape, a square shape, or a film shape. For example, the magnesium battery 1 may be a battery of a large film shape. The magnesium battery 1 may be a magnesium ion battery.

A separator may be arranged between a positive electrode and a negative electrode to form a battery structure. After the battery structure is laminated in a bi-cell structure, the battery structural body is impregnated in an organic electrolyte solution. The resulting product is included and sealed in a pouch to complete a magnesium polymer battery.

In addition, a multiple number of battery structures may be laminated to form a battery pack, and the battery pack may be used in all devices requiring a high capacity. For example, the battery pack may be used in a laptop computer, a smartphone, an electric vehicle, and others.

In addition, as the magnesium battery has excellent storage stability and thermal stability, the magnesium battery may be used in an energy storage system (ESS) or an electric vehicle (EV). For example, the magnesium battery may be used in a hybrid vehicle such as a plug-in hybrid electric vehicle (PHEV).

A method of preparing an electrode active material for a magnesium battery, according to another aspect of the present invention, includes obtaining a complex transition metal oxide with a spinel structure by a solid phase method or a liquid phase method; and preparing a complex transition metal oxide which is represented by a Formula 1 below and which includes λ-MnO$_2$ phase having a cubic structure at a percentage of 60% or higher by treating with an acid the complex transition metal oxide having a spinel structure:

$$M_xMn_yO_z \qquad <\text{Formula 1}>$$

In the Formula 1,
0<x≤1, 0.25≤y≤1, and 1≤z<3; and
M is at least one metal selected from Mg$^{2+}$, Ca$^{2+}$, Na$^+$, K$^+$, and Zn$^{2+}$.

For example, the complex transition metal oxide having a spinel structure may include a complex transition metal oxide having a spinel structure prepared by a Pechini method. The complex transition metal oxide may be prepared, for example, by the following method: First, a solution prepared by mixing a metal precursor hydrate, citric acid, and a polyhydroxy alcohol such as ethylene glycol is stirred and water is removed from the mixture solution by heat treatment to obtain a gelated product. The gelated product is a polymerized solid resin prepared by the condensation polymerization of citric acid and a polyhydroxy alcohol such as ethylene glycol. The solid resin has a cross-linked network structure in which a metal atom matrix is linked with an organic radical through oxygen. Subsequently, the solid resin is calcinated at a temperature higher than 500° C. to calcinate the polymer matrix, and then a complex transition metal oxide having a spinel structure may be obtained. A complex transition metal oxide having a spinel structure prepared by this Pechini method may be used to prepare a complex transition metal oxide having an average particle diameter in a nanometer scale and to prepare a high-capacity magnesium battery by increasing specific reactive area.

However, the complex transition metal oxide having a spinel structure may be prepared by all solid phase methods or liquid phase methods which may be used in the art, beside the Pechini method. For example, a metal precursor having a composition which may form the complex transition metal oxide may be mixed with a solution, and the precipitate may be filtered, washed, dried, and heat-treated at a temperature from about 200° C. to about 600° C. in an air atmosphere to prepare the complex transition metal oxide having a spinel structure. The solution may selectively include an oxidizing agent or a reducing agent. The heat treatment atmosphere may be, for example, one of an inert atmosphere of nitrogen or argon; an oxidizing atmosphere of air, oxygen, oxygen-containing nitrogen, or oxygen-containing argon; and a reducing atmosphere of hydrogen-containing nitrogen which contains hydrogen from about 0.1 vol % to about 10 vol % or hydrogen-containing argon which contains hydrogen from about 0.1 vol % to about 10 vol %. For example, for heat treatment in a strong reducing atmosphere, an appropriate quantity of carbon may be included in the metal precursor mixture for calcination. Appropriately, heat treatment may be performed in an oxidizing atmosphere of air or others.

Next, the complex transition metal oxide having a spinel structure is treated with an acid to prepare the complex transition metal oxide which includes λ-MnO$_2$ phase having a cubic structure at a percentage of 60% or higher and which is represented by the Formula 1.

The average particle diameter of the complex transition metal oxide represented by the Formula 1 may be from about 1 nm to about 200 nm. For example, the average particle diameter of the complex transition metal oxide may be about 1 nm to about 150 nm. For example, the average particle diameter of the complex transition metal oxide may be about 1 nm to about 100 nm.

In the Formula 1, the range of x, y, and z may respectively be 0<x≤0.5, 0.25≤y≤1, and 1≤z<2.5. For example, M may be Mg$^{2+}$.

The acid concentration during the acid treatment may be from about 0.1 M to about 3 M. For example, the acid concentration during the acid treatment may be 2.5 M. As the acid treatment time is increased within the acid concentration range, the dominant phase having the complex transition metal oxide may transit from λ-MnO$_2$ phase in the acid treatment time from about 30 minutes to about six hours to α-MnO$_2$ phase in the acid treatment time from about six hours to 24 hours and to β-MnO$_2$ phase in the acid treatment time longer than 36 hours. The duration of the acid treatment for the complex transition metal oxide which includes λ-MnO$_2$ phase at a percentage of 60% or higher may be controlled in the range from about 30 minutes to about six hours.

However, within a range in which the complex transition metal oxide which includes λ-MnO$_2$ phase at a percentage of 60% or higher may be prepared by increasing or decrease the acid treatment time, without being limited by the acid concentration for the acid treatment, the acid concentration for the acid treatment may be controlled. The acid used for the acid treatment may include nitric acid, sulfuric acid, hydrochloric acid, acetic acid, or a salt thereof.

When the complex transition metal oxide according to an embodiment of the present invention is treated with an acid in the acid concentration range described above for from about 30 minutes to about six hours, some Mg$^{2+}$ ions are leached and an Mg$^{2+}$ ion reduction reaction simultaneously occurs to prepare the complex transition metal oxide which includes λ-MnO$_2$ phase at a percentage of 60% or higher and Mg at a percentage higher than 0 wt % and lower than 10 wt % with respect to the total complex transition metal oxide weight and which is represented by the Formula 1.

As a magnesium battery includes the complex transition metal oxide, the average discharge voltage, charge/discharge efficiency, and charge/discharge capacity of the magnesium battery may be improved and lifecycle properties may be further improved.

Hereinafter, the present invention will be described in further detail with reference to examples. It will be obvious to a person having ordinary skill in the art that these examples are illustrative purposes only and are not to be construed to limit the scope of the present invention.

EXAMPLES

Preparation of Positive Electrode Active Material

Example 1

$Mg(NO_3)_2 \cdot 6H_2O$ (available from Aldrich), $Mn(NO_3)_2 \cdot xH_2O$ (available from Aldrich), citric acid (available from Aldrich), and ethylene glycol (available from Aldrich) were added to deionized water, and the resulting mixture was stirred for one hour to prepare a mixed solution. The mixed solution was treated with heat in an oven at 300° C. for two hours to gelate citric acid and ethylene glycol by condensation polymerization. Then, the gelated product was treated with heat in an oven at 550° C. for four hours to obtain spheric $MgMn_2O_4$ particles having an average particle diameter of about 100 nm and a spinel structure. After dipping the $MgMn_2O_4$ into a 2.5 M sulfuric acid solution, some $Mg^{2+}$ ions were leached under an air atmosphere at 95° C. for three hours to prepare a complex transition metal oxide.

The prepared complex transition metal oxide was $Mg_{0.016}MnO_2$ including about 65% of $\lambda$-$MnO_2$ phase having a quasi-equilibrium state cubic structure and about 35% of $MnO_2$ phase having a Birnessite structure.

Example 2

Except that, instead of dipping the $MgMn_2O_4$ into a 2.5 M sulfuric acid solution and leaching some Mg2+ ions under an air atmosphere at 95° C. for three hours to prepare a complex transition metal oxide, the $MgMn_2O_4$ was dipped into a 2.5 M sulfuric acid solution and some $Mg^{2+}$ ions were leached under an air atmosphere at 95° C. for six hours to prepare the complex transition metal oxide, the complex transition metal oxide was prepared in the same method as that of Example 1.

The prepared complex transition metal oxide was $Mg_{0.01}MnO_2$ including about 74% of $\lambda$-$MnO_2$ phase having a quasi-equilibrium state cubic structure and about 26% of $MnO_2$ phase having a Birnessite structure.

Comparative Example 1

Except that, instead of dipping the $MgMn_2O_4$ into a 2.5 M sulfuric acid solution and leaching some $Mg^{2+}$ ions under an air atmosphere at 95° C. for three hours to prepare a complex transition metal oxide, the $MgMn_2O_4$ was dipped into a 2.5 M sulfuric acid solution and some $Mg^{2+}$ ions were leached under an air atmosphere at 95° C. for 23 hours to prepare the complex transition metal oxide, the complex transition metal oxide was prepared in the same method as that of Example 1.

The prepared complex transition metal oxide was $Mg_{0.005}MnO_2$ including about 90% of $\alpha$-$MnO_2$ phase and about 10% of $MnO_2$ phase having a Ramsdellite structure.

Reference Example 1

$Mg(NO_3)_2 \cdot 6H_2O$ (available from Aldrich), $Mn(NO_3)_2 \cdot xH_2O$ (available from Aldrich), citric acid (available from Aldrich), and ethylene glycol (available from Aldrich) were added to deionized water, and the resulting mixture was stirred for one hour to prepare a mixed solution. The mixed solution was treated with heat in an oven at 300° C. for two hours to gelate citric acid and ethylene glycol by condensation polymerization. Then, the gelated product was treated with heat in an oven at 550° C. for four hours to obtain spheric $MgMn_2O_4$ particles having an average particle diameter of about 100 nm and a spinel structure.

Preparation of Magnesium Battery

Example 3

The positive electrode active material prepared in Example 1, Ketjen black as a conductive material, and PVdF as a binder were added at the weight ratio of 70:10:20 to N-methyl pyrrolidone (NMP) and mixed to prepare a positive electrode active material slurry. The positive electrode active material slurry was tape-coated on a 15 μm thick aluminum current collector with a 200 μm thickness, and the resulting product was dried in an vacuum oven at 120° C. for two hours and cut into a circle having a 12 mm diameter to prepare a positive electrode plate.

The positive electrode plate was arranged in a Teflon vessel, a 100 μm magnesium foil was used as a counter electrode, an Ag/AgCl electrode was used as a reference electrode, and an organic electrolyte solution prepared by dissolving 0.5 M $Mg(ClO_4)_2$ in acetonitrile (AC) was used to constitute a three-electrode system. The inside of the Teflon vessel was kept in an argon atmosphere and the Teflon vessel was sealed to block the air.

Example 4

Except that, instead of the positive electrode active material prepared in Example 1, the positive electrode active material prepared in Example 2 was used, a magnesium battery was prepared by the same method as that of Example 3.

Comparative Example 2

Except that, instead of the positive electrode active material prepared in Example 1, the positive electrode active material prepared in Comparative Example 1 was used, a magnesium battery was prepared by the same method as that of Example 3.

Evaluation Example 1: Scanning Electron Microscope (SEM) Experiment

SEM images of the positive electrode active materials prepared in Reference Example 1 and Examples 1 and 2 were taken. The images are shown in FIGS. 2a to 2c.

As shown in FIG. 2a, the configuration of the $MgMn_2O_4$ positive electrode active material having a spinel structure in Reference Example 1 shows a spherical shape. As shown in FIGS. 2b to 2c, the configurations of the $MgMn_2O_4$ positive electrode active materials prepared in Examples 1 and 2 show mixed shapes including a needle-like shape or a spherical shape, and the needle-like shape is a shape of a nano-rod or a nano-sheet.

The average particle diameter of the positive electrode active material prepared in Examples 1 and 2 was about 100 nm.

Evaluation Example 2: X-Ray Diffusion (XRD) Evaluation

An XRD experiment was performed with the positive electrode active materials prepared in Examples 1 and 2, and Comparative Example 1. The result of the XRD experiment shows in FIG. 4.

As shown in FIG. 4, the positive electrode active materials prepared in Examples 1 and 2 show a characteristic peak of a cubic structure λ-MnO$_2$ phase having λ-MnO$_2$ 120 peak and λ-MnO$_2$ 300 peak at the 2θ angle of 18°±1° and 45°±1°, respectively. In contrast to the positive electrode active materials prepared in Examples 1 and 2, the positive electrode active material prepared in Comparative Example 1 does not show a characteristic peak of cubic structure λ-MnO$_2$ phase, such as λ-MnO$_2$ 120 peak and λ-MnO$_2$ 300 peak.

In addition, the size of the characteristic peak of cubic structure λ-MnO$_2$ phase having the positive electrode active material prepared in Example 2 was smaller than the size of the characteristic peak of cubic structure λ-MnO$_2$ phase having the positive electrode active material prepared in Example 1. The result indicated that the content of the cubic structure λ-MnO$_2$ phase included in the positive electrode active material prepared in Example 2 was higher than the content of the cubic structure λ-MnO$_2$ phase included in the positive electrode active material prepared in Example 1.

Evaluation Example 3: XPS Experiment

A double-sided adhesive tape was put onto a metal plate, and samples of the positive electrode active material prepared in Examples 1 and 2 and the positive electrode active material prepared in Comparative Example 1 were scattered on the double-sided adhesive tape in a thickness which makes the double-sided adhesive tape not be seen. Then, the surface was made flat, pressed, and fixed at a folder. A monochromated AlKα ray (1486.6 eV and 27.7 W) was used as a light source for measurements. The measurement area was 0.1 mm2 and the extraction angle was 45°. XPS (XPS, Physical Electronics, Quantum 2000 Scanning ESCAMicroprobe) was used to obtain the spectrum at the core levels of Mn2p$_{1/2}$ of Mn$^{3+}$ and Mn2p$_{3/2}$ of Mn$^{4+}$. FIG. 5 shows the result of the experiment. From the result shown in FIG. 5, the Mg content (wt %) and the average oxidation number of the Mn positive ion existing in the positive electrode active materials prepared in Examples 1 and 2 and those existing in the positive electrode active materials prepared in Comparative Example 1 were calculated and are shown in Table 1 below.

TABLE 1

| Item | Mg content (wt %) | Average oxidation number Mn positive ion (Mn$^{3+}$: Mn$^{4+}$) |
|---|---|---|
| Example 1 | 1.27 | +4 |
| Example 2 | 0.81 | +3.8(8:2) |
| Comparative Example 1 | 0 | +3.5(5:5) |

As shown in FIG. 5, the positive electrode active material prepared in Examples 1 and 2 and the positive electrode active material prepared in Comparative Example 1 showed a peak in a range from about 640 eV and to about 643 eV corresponding to the binding energy of the core levels of Mn2p$_{1/2}$ of Mn$^{3+}$ and Mn2p$_{3/2}$ of Mn$^{4+}$, respectively. The peak corresponding to the binding energy of the core level of Mn2p$_{3/2}$ of Mn$^{4+}$ included in the positive electrode active material prepared in Example 1 was the highest, while the peak corresponding to the binding energy of the core level of Mn2p$_{3/2}$ of Mn$^{4+}$ included in the positive electrode active material prepared in Comparative Example 1 was the smallest.

In addition, as shown in Table 1 above, the Mg content existing in the positive electrode active materials prepared in Examples 1 and 2 was 1.27 wt % and 0.81 wt %, respectively, while the Mg content existing in the positive electrode active material prepared in Comparative Example 1 was 0 wt %. This result indicates that the Mg content included in the positive electrode active materials prepared in Examples 1 and 2 was higher than 0 wt %.

In addition, the average oxidation number of an Mn positive ion existing in the positive electrode active materials prepared in Examples 1 and 2 was +4 and +3.8, respectively, while the average oxidation number of an Mn positive ion existing in the positive electrode active material prepared in Comparative Example 1 was +3.5. This result indicates that the average oxidation number of an Mn positive ion existing in the positive electrode active materials prepared in Examples 1 and 2 was +3.6 or higher and that the ratio of Mn4+ to the sum of the Mn ion oxidation numbers was 60% or higher.

Evaluation Example 4: Charge/Discharge Property Experiment

The magnesium batteries prepared in Examples 3 and 4 and in Comparative Example 2 were charged and discharged at room temperature in a voltage range from about −2.0 V to about 0.9 V with respect to the Ag/Ag$^+$ reference electrode up to five cycles with constant current of 0.2 C. The results are shown in FIGS. 6a and 6b and Table 2. The charge/discharge efficiency was calculated as the ratio of the discharge capacity at a first cycle to the charge capacity at the first cycle. The average discharge voltage was calculated as a value obtained by integrating the discharge curve in the electric capacity (x-axis)-voltage (y-axis) graph and then dividing the integration value by the maximum discharge capacity.

TABLE 2

| Item | Discharge capacity in first cycle (mAh/g) | Charge/discharge efficiency (%) | Average discharge voltage (V) |
|---|---|---|---|
| Example 3 | 192 | 83 | 2.16 |
| Example 4 | 330 | 93 | 2.09 |
| Comparative Example 2 | 261 | 44 | 1.86 |

As shown in FIGS. 6a and 6b and Table 2, the discharge capacity at a first cycle, charge/discharge efficiency, and average discharge voltage of the magnesium battery prepared in Examples 3 and 4 were all higher than those of the magnesium battery prepared in Comparative Example 2.

In addition, as shown in FIGS. 6a and 6b, the discharge capacity at a fifth cycle of the magnesium battery prepared in Comparative Example 2 was 80 mAh/g, which was about 30.6% lower than the discharge capacity at a first cycle. However, the discharge capacity at a fifth cycle of the magnesium battery prepared in Example 4 was 200 m Ah/g, which was about 60.6% lower than the discharge capacity at a first cycle. This result indicates that the lifecycle property of the magnesium battery prepared in Example 4 was about two times better than the lifecycle property of the magnesium battery prepared in Comparative Example 2.

Evaluation Example 5: Interfacial Resistance Property Experiment

Immediately after charging and discharging the magnesium batteries prepared in Example 4 and in Comparative Example 2 at room temperature in a voltage range from about −2.0 V to about 0.9 V with respect to the Ag/Ag$^+$ reference electrode in one cycle with constant current of 0.2 C, the impedance was measured. The results are shown in FIGS. 7a and 7b and in Table 3. In FIGS. 7a and 7b, the impedance of each magnesium battery is determined by the position and size of a semicircle. In other words, a first x-axis (i.e. horizontal axis) intercept of a semicircle represents electrolyte resistance and the difference between a first x-axis intercept and a second x-axis intercept represents the interfacial resistance between a positive electrode and an electrolyte.

TABLE 3

| Item | $R_{ct}$(Discharge) [Ω] | $R_{ct}$(Charge) [Ω] |
| --- | --- | --- |
| Example 4 | 64.2 | 128.4 |
| Comparative Example 2 | 259.8 | 343.2 |

As shown in FIGS. 7a and 7b and in Table 3, the interfacial resistance between a positive electrode and an electrolyte of the magnesium battery prepared in Example 4 was 64.2Ω, and the interfacial resistance between a positive electrode and an electrolyte of the magnesium battery prepared in Comparative Example 2 was 83.4Ω. The interfacial resistance between a positive electrode and an electrolyte of the magnesium battery prepared in Example 2 was about 30% lower than the interfacial resistance between a positive electrode and an electrolyte of the magnesium battery prepared in Comparative Example 2.

As described above, according to the one or more embodiments of the present invention above, as a magnesium battery includes, as an electrode active material, a complex transition metal oxide which includes λ-MnO$_2$ phase having a cubic structure at a percentage of 60% or higher and which is represented by the Formula 1, the average discharge voltage, the charge/discharge efficiency, and the charge/discharge capacity of the magnesium battery may be improved.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. An electrode active material for a magnesium battery, the electrode active material comprising a complex transition metal oxide which is represented by a Formula 1 below and which includes λ-MnO$_2$ phase having a cubic structure at a percentage of 60% or higher:

$$(Mg)_v MnO_w \qquad \text{<Formula 1>}$$

In the Formula 1,
0<v≤0.2 and 1<w<2.5.

2. The electrode active material for a magnesium battery of claim 1, wherein the average oxidation number of the Mn positive ion of the complex transition metal oxide is +3.6 or higher.

3. The electrode active material for a magnesium battery of claim 1, wherein the percentage of Mn$^{4+}$ with respect to the oxidation number of the total Mn positive ions is 60% or higher in an XPS analysis of the complex transition metal oxide.

4. The electrode active material for a magnesium battery of claim 1, wherein the content of Mg included in the complex transition metal oxide is more than 0 wt % and less than 10 wt % with respect to the total weight of the complex transition metal oxide.

5. The electrode active material for a magnesium battery of claim 1, wherein the average particle diameter of the complex transition metal oxide is from about 1 nm to about 200 nm.

6. The electrode active material for a magnesium battery of claim 1, wherein the shape of the complex transition metal oxide includes a needle-like shape and a spherical shape.

7. The electrode active material for a magnesium battery of claim 1, wherein the complex transition metal oxide further includes a phase having a Birnessite structure.

8. The electrode active material for a magnesium battery of claim 1, wherein the electrode active material is a positive electrode active material.

9. An electrode for a magnesium battery, comprising the electrode active material according to claim 1.

10. A magnesium battery comprising:
a positive electrode including the electrode active material according to claim 8;
a negative electrode; and
an electrolyte.

11. The magnesium battery of claim 10, wherein the operation potential of the positive electrode active material is from about 1 V to about 4 V (vs. Mg/Mg$^{2+}$).

12. The magnesium battery of claim 10, wherein the negative electrode comprises a magnesium metal, a magnesium metal-based alloy, a magnesium intercalating compound, or a carbonaceous material.

13. The magnesium battery of claim 10, further comprising a separator interposed between the positive electrode and the negative electrode.

14. A method of preparing an electrode active material for a magnesium battery, the method comprising
obtaining a complex transition metal oxide having a spinel structure by a solid phase method or a liquid phase method; and
preparing a complex transition metal oxide which is represented by a Formula 1 below and which includes λ-MnO$_2$ phase having a cubic structure at a percentage of 60% or higher by treating with an acid the complex transition metal oxide having the spinel structure:

$$(Mg)_v MnO_w \qquad \text{<Formula 1>}$$

In the Formula 1,
0<v≤0.2 and 1<w<2.5.

15. The method of preparing an electrode active material for a magnesium battery of claim 14, wherein the complex transition metal oxide having the spinel structure comprises a complex transition metal oxide having a spinel structure prepared by a Pechini method.

16. The method of preparing an electrode active material for a magnesium battery of claim 14, wherein the average particle diameter of the complex transition metal oxide represented by the Formula 1 is from about 1 nm to about 200 nm.

17. The method of preparing an electrode active material for a magnesium battery of claim 14, wherein, in the Formula 1, $0<x\leq0.5$, $0.25\leq y\leq1$, and $1\leq z<2.5$.

18. The method of preparing an electrode active material for a magnesium battery of claim 14, wherein the acid concentration during the acid treatment is from about 0.1 M to about 3 M.

19. The method of preparing an electrode active material for a magnesium battery of claim 14, wherein the acid used for the acid treatment is nitric acid, sulfuric acid, hydrochloric acid, acetic acid, or a salt thereof.

20. The method of preparing an electrode active material for a magnesium battery of claim 14, wherein the content of Mg included in the complex transition metal oxide represented by the Formula 1 is more than 0 wt % and less than 10 wt % with respect to the total weight of the complex transition metal oxide.

* * * * *